US012166287B2

(12) United States Patent
Wang et al.

(10) Patent No.: US 12,166,287 B2

(45) Date of Patent: Dec. 10, 2024

(54) TERMINAL ANTENNA AND TERMINAL ELECTRONIC DEVICE

(71) Applicant: HONOR DEVICE CO., LTD., Shenzhen (CN)

(72) Inventors: Yi Wang, Shenzhen (CN); Chongfeng Zhao, Shenzhen (CN); Kunpeng Wei, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 87 days.

(21) Appl. No.: 18/008,907

(22) PCT Filed: May 12, 2022

(86) PCT No.: PCT/CN2022/092521

§ 371 (c)(1), (2) Date: Dec. 7, 2022

(87) PCT Pub. No.: WO2022/247652

PCT Pub. Date: Dec. 1, 2022

(65) Prior Publication Data

US 2023/0238717 A1 Jul. 27, 2023

(30) Foreign Application Priority Data

May 28, 2021 (CN) ........................ 202110594251.7

(51) Int. Cl.

*H01Q 21/30* (2006.01)
*H01Q 1/24* (2006.01)
*H01Q 9/04* (2006.01)

(52) U.S. Cl.

CPC ............. *H01Q 21/30* (2013.01); *H01Q 1/243* (2013.01); *H01Q 9/0407* (2013.01)

(58) Field of Classification Search

CPC ....... H01Q 21/30; H01Q 1/243; H01Q 9/0407
See application file for complete search history.

(56) References Cited

U.S. PATENT DOCUMENTS

| | | | |
|---|---|---|---|
| 6,014,112 | A | 1/2000 | Koscica et al. |
| 10,644,381 | B2 | 5/2020 | Ye et al. |
| 2022/0140471 | A1 | 5/2022 | Sun et al. |

FOREIGN PATENT DOCUMENTS

| | | | |
|---|---|---|---|
| CN | 105609969 | A | 5/2016 |
| CN | 108346863 | A | 7/2018 |

(Continued)

*Primary Examiner* — Graham P Smith

(74) *Attorney, Agent, or Firm* — WOMBLE BOND DICKINSON (US) LLP

(57) ABSTRACT

This application provides a terminal antenna, including a first radiator, a second radiator, a third radiator, a first tuning circuit, and a second tuning circuit. The third radiator includes a low frequency radiator and a medium-high frequency radiator. The first tuning circuit is configured to adjust a frequency of a resonance of a ¾λ mode of a medium-high frequency produced by the low frequency radiator to be less than a frequency of a resonance of a left-handed antenna mode. The second tuning circuit is configured to adjust the frequency of the resonance of the left-handed antenna mode to be greater than the frequency of the resonance of the ¾λ mode of the medium-high frequency produced by resonating by the low frequency radiator. Values of both the first distance and the second distance are less than ¹⁄₁₆λ of a frequency band in which the third radiator produces a low frequency.

15 Claims, 10 Drawing Sheets

(56) References Cited

FOREIGN PATENT DOCUMENTS

| | | | |
|---|---|---|---|
| CN | 109687151 | A | 4/2019 |
| CN | 111628298 | A | 9/2020 |
| CN | 111725608 | A | 9/2020 |
| CN | 211829200 | U | 10/2020 |
| CN | 212277399 | U | 1/2021 |
| CN | 112531331 | A | 3/2021 |
| CN | 112736454 | A | 4/2021 |
| CN | 112736459 | A | 4/2021 |
| CN | 112768959 | A | 5/2021 |
| CN | 113922048 | A | 1/2022 |
| WO | 2020173294 | A1 | 9/2020 |

TERMINAL ANTENNA AND TERMINAL ELECTRONIC DEVICE

CROSS-REFERECNE TO RELATED APPLICATIONS

This application is a national stage of International Application No. PCT/CN2022/092521, filed on May 12, 2022, which claims priority to Chinese Patent Application No. 202110594251.7, filed on May 28, 2021. The disclosures of both of the aforementioned application are hereby incorporated by reference in their entireties.

TECHNICAL FIELD

This application relates to the field of communication technologies, and in particular, to a terminal antenna and a terminal electronic device.

BACKGROUND

In a mobile communication system, NSA dual low-band non-independent networking is co-working (simultaneous transmission and reception) of a 4G low band and a 5G low band, and in a conventional design, the 4G low band and the 5G low band each require at least two independent antennas. However, a low-band antenna is too large in size to be accommodated by mobile electronic devices such as mobile phones due to their usually insufficient space. In addition, as the mobile phones and other mobile terminals tend to develop with a high screen-to-body ratio, the layout space of antennas is greatly reduced. Therefore, how to arrange antennas in limited space to ensure antenna performance and coverage has become a major problem in antenna design.

SUMMARY

This application provides a terminal antenna and a terminal electronic device, to arrange more antennas in limited space to satisfy a low frequency antenna coverage bandwidth.

This application provides a terminal antenna, including a first radiator, a second radiator, a third radiator, a first tuning circuit, and a second tuning circuit, where the third radiator, the first radiator, and the second radiator are terminal frame antenna radiators and spaced by slots, and the first radiator, the second radiator, and the third radiator are respectively connected to a first feed, a second feed, and a third feed for signal transmission; the third radiator includes a low frequency radiator constituting a low frequency antenna and a medium-high frequency radiator constituting a medium-high frequency antenna, and the low frequency radiator and the medium-high frequency radiator are spaced by a first slot; and the low frequency radiator and the medium-high frequency radiator are self-grounded;

the first tuning circuit connects the third feed and one side of the low frequency radiator adjacent to the first slot, and the second tuning circuit connects the third feed and an end portion of the medium-high frequency radiator located in the first slot; the low frequency radiator resonates to produce a resonance of a ¼λ mode of a low frequency and a resonance of a ¾λ mode of a medium-high frequency, and the medium-high frequency radiator resonates to produce a resonance of a left-handed antenna mode; and a linear distance from one end of the first tuning circuit connected to the third feed to the other end of the first tuning circuit connected to the low frequency radiator is a first distance, a linear distance from one end of the second tuning circuit connected to the third feed to the other end of the second tuning circuit connected to the medium-high frequency radiator is a second distance, and values of both the first distance and the second distance are less than ¹⁄₁₆λ of a frequency band in which the third radiator produces a low frequency; and the low frequency radiator of the third radiator, the first radiator, and the second radiator jointly form a dual low-frequency antenna mode of a 5G NSA, where the low frequency radiator and the medium-high frequency radiator work simultaneously, the first tuning circuit is configured to adjust a frequency of the resonance of the ¾λ mode of the medium-high frequency produced by the low frequency radiator to be less than a frequency of the resonance of the left-handed antenna mode, and the second tuning circuit is configured to adjust the frequency of the resonance of the left-handed antenna mode to be greater than the frequency of the resonance of the ¾λ mode of the medium-high frequency produced by resonating by the low frequency radiator.

A linear distance from one end of the first tuning circuit connected to the third feed to the other end of the first tuning circuit connected to the low frequency radiator is a first distance, a linear distance from one end of the second tuning circuit connected to the third feed to the other end of the second tuning circuit connected to the medium-high frequency radiator is a second distance, and values of both the first distance and the second distance are less than ¹⁄₁₆λ of a frequency band in which the third radiator produces a low frequency. The third radiator includes a low frequency radiator constituting a low frequency antenna and a medium-high frequency radiator constituting a medium-high frequency antenna, to implement performance of simultaneous operation of a low frequency and a medium-high frequency. The medium-high frequency radiator at a bottom portion of the low frequency antenna of the third radiator is added through distributed feeding. In an EN-DC state, a low frequency state and a medium-high frequency antenna state can coexist, without affecting a dual-card feature.

In an embodiment, the third feed is separately connected to the first tuning circuit and the second tuning circuit through a radio frequency signal microstrip, to transmit a radio frequency signal for the first tuning circuit and the second tuning circuit.

In an embodiment, the first tuning circuit includes an inductor connected in series with the third feed and the low frequency radiator, and the second tuning circuit includes a capacitor connected in series with the third feed and the medium-high frequency radiator.

In an embodiment, the first tuning circuit includes a distributed inductor connected in series with the third feed, and the second tuning circuit includes a distributed capacitor connected in series with the third feed.

In an embodiment, the first tuning circuit includes a first matching circuit that connects the third feed in series with the low frequency radiator, and the second tuning circuit includes a second matching circuit that connects the third feed in series with the medium-high frequency radiator. The first matching circuit and/or the second matching circuit is an L-type matching circuit, a π-type matching circuit, or a combination of π-type and L-type matching circuits. The first tuning circuit and the second tuning circuit can be used to adjust the frequency of the resonance of the ¾λ mode of the medium-high frequency produced by the low frequency radiator to be less than the frequency of the resonance of the left-handed antenna mode, so that simultaneous operation of the low frequency radiator and a high frequency radiator is implemented.

In an embodiment, the medium-high frequency radiator includes a medium-high frequency stub and a parasitic stub, the medium-high frequency stub and the parasitic stub are spaced by a second slot, and the medium-high frequency stub is located between the low frequency radiator and the parasitic stub; and the medium-high frequency stub and the parasitic stub are separately self-grounded, the medium-high frequency stub resonates to produce a resonance of a ¼λ mode, the parasitic stub resonates to produce a resonance of a parasitic mode, and the medium-high frequency stub and the parasitic stub provide medium-high frequency radiation for the terminal antenna.

In an embodiment, a frequency of a resonance of the left-handed antenna mode produced by the medium-high frequency stub is 1.7 GHz; and a resonance of the ¼λ mode produced by the medium-high frequency stub and a resonance of the parasitic mode of the parasitic stub jointly cover a frequency ranging from 1.9 GHz to 2.7 GHz.

In an embodiment, a resonant frequency covered by the resonance of the ¼λ, mode produced by the low frequency radiator ranges from 0.5 GHz to 1 GHz; and a resonant frequency covered by the resonance of the ¾λ mode of the medium-high frequency produced by the low frequency radiator ranges from 1.5 GHz to 1.6 GHz. The terminal antenna in this embodiment can cover a larger-range low frequency band and requires a reduced bandwidth.

In an embodiment, a ground point of the medium-high frequency stub and/or the parasitic stub may be further connected to a tuning element, and the tuning element is configured to adjust a type of each antenna mode and an operating band of the third radiator.

In an embodiment, when the first radiator resonates to produce a low frequency operating band covering 5G, the second radiator resonates to produce a low frequency operating band covering 4G, and when the first radiator resonates to produce a low frequency operating band covering 4G, the second radiator resonates to produce a low frequency operating band covering 5G and the third radiator resonates to produce a low frequency operating band covering 5G and a low frequency operating band covering 4G.

In an embodiment, the terminal antenna further includes a fourth radiator and a fourth feed connected to the fourth radiator, the fourth radiator and the third radiator are located at two opposite ends of the second radiator, the fourth radiator and the second radiator are co-grounded, the fourth radiator is further connected to a tuner, the tuner adjusts the fourth radiator to switch between a high frequency antenna mode and a low frequency antenna mode, and the fourth radiator of the low frequency antenna mode produces a same left-handed antenna mode as the fourth radiator of the high frequency antenna mode.

In an embodiment, the fourth radiator includes a medium-high frequency radiation stubs and a medium-high frequency parasitic stubs spaced by a slot, one end of the medium-high frequency radiation stub close to the slot is connected to the fourth feed, the other end of the medium-high frequency radiation stub is co-grounded with the second radiator, and the tuner is connected to a location between the two ends of the medium-high frequency radiation stub; and in a case that the fourth radiator serves as a high frequency antenna, the medium-high frequency radiation stub produces a resonance of a left-handed antenna mode, and the medium-high frequency parasitic stubs of the fourth radiator is coupled through the slots to form a parasitic resonance. In an embodiment, the fourth radiator resonates to produce a low frequency operating band covering 4G or 5G. In this embodiment, within limited space, a larger range of resonant frequencies is implemented by setting the fourth radiator and the second radiator to be co-grounded. In an EN-DC state, a state of the fourth radiator is tuned to a low frequency state through antenna switch tuning. In this way, a bandwidth that needs to be covered by the third radiator and the fourth radiator can be reduced by 28% to 50%, and requirements of other dual low-frequency EN-DC combinations to be added in the future can be met.

This application provides an electronic device, including a middle frame, a frame provided around a periphery of the middle frame, a mainboard, and the terminal antenna, where part of the frame is the antenna, the terminal further includes a first side portion and a bottom portion adjacent to the first side portion, the medium-high frequency radiator of the third radiator is located at the bottom portion, the low frequency radiator is located on the first side portion, ground points of the first radiator, the second radiator, and the third radiator are provided on the middle frame, and the third feed is provided on the mainboard.

In an embodiment, in a case that the terminal antenna further includes a fourth radiator and a fourth feed, part of the frame is the fourth radiator, the terminal further includes a top portion, the fourth radiator is located on the top portion, the second radiator is located on the first side portion and the top portion and is co-grounded with the fourth radiator, and the fourth feed and the tuner are provided on the mainboard.

In the terminal antenna in this application, the third radiator implements performance of simultaneous operation of a low frequency and a medium-high frequency, and three radiators are provided to implement a dual low-frequency resonant frequency of a 5G NSA. The low frequency radiator 31 and the medium-high frequency radiator share a feed and there is no need to add any feed or connection structure to the space, so that a coverage bandwidth required by an antenna can be reduced while a range of the dual low-frequency resonant frequency is ensured in the limited space.

BRIEF DESCRIPTION OF DRAWINGS

To describe the technical solutions in the embodiments of this application or in the background more clearly, the following describes the accompanying drawings required for describing the embodiments of this application or the background.

DESCRIPTION OF EMBODIMENTS

The following describes the embodiments of this application with reference to the accompanying drawings in the embodiments of this application.

This application provides a terminal antenna and a terminal electronic device that includes the terminal antenna. Radiators of the terminal antenna can implement a dual low-frequency antenna mode and work simultaneously with a medium-high frequency antenna mode to reduce space occupied by an antenna and other related elements and implement a low frequency coverage bandwidth. The electronic device includes an electronic device such as a mobile phone, a tablet computer, or a smartwatch.

Figure 1:
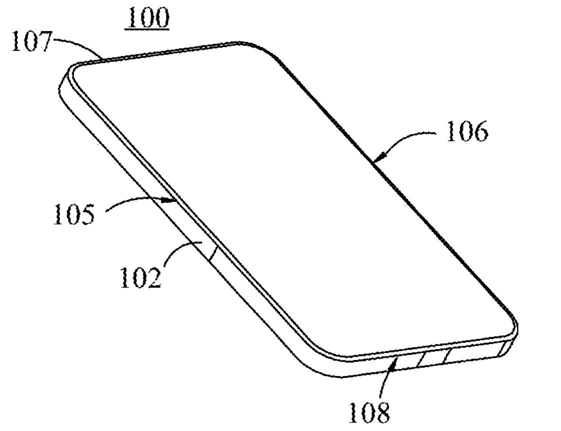
FIG. 1 is a schematic diagram of an electronic device according to this application.

Referring to FIG. 1, the terminal antenna of this embodiment is described by using an example in which the terminal antenna is used in a mobile phone. The terminal antenna can implement a low frequency band of 4G and a low frequency band of 5G to meet a dual low frequency combination requirement of EN-DC (EUTRA-NR Dual Connectivity).

Figure 2:
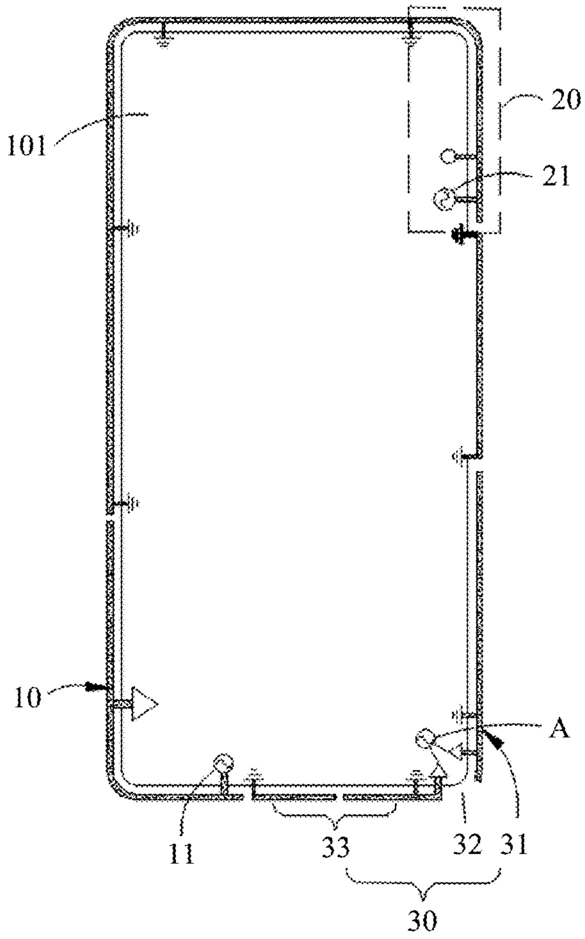
FIG. 2 is a schematic diagram of a terminal antenna according to this application and is used in the electronic device shown in FIG. 1, where connection locations of a first tuning circuit and a second tuning circuit with a third feed, a low frequency radiator, and a medium-high frequency radiator are simplified structural diagrams and do not represent actual circuit diagrams.

Also referring to FIG. 2, the mobile phone 100 includes a middle frame 101, and a frame 102 provided around a periphery of the middle frame 101, and a mainboard 103 mounted on the middle frame. The frame 102 is of a narrow frame structure. The frame 102 is a metal frame. Part of the frame 102 is the antenna. The mobile phone 100 further includes a first side portion 105, a second side portion 106, a top portion 107, and a bottom portion 108. The first side portion 105 and the second side portion 106 correspond to two opposite sides of the mobile phone 100. The top portion 107 and the bottom portion 108 correspond to the top and the bottom of the mobile phone 100.

Figure 2A:
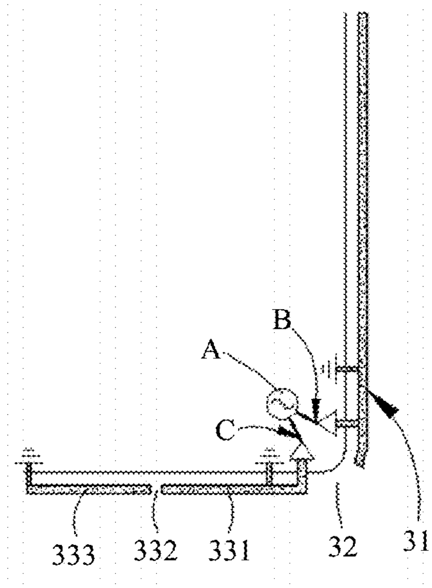
FIG. 2*a* is a partial enlarged structural view of the terminal antenna shown in FIG. 2.

Also referring to FIG. 2*a*, the terminal antenna includes a first radiator 10, a second radiator 20, a third radiator 30, a first tuning circuit B, and a second tuning circuit C. The third radiator 30, the first radiator 10, and the second radiator 20 are mobile phone frame antenna radiators and spaced by slots S. The first radiator 10 is connected to a first feed 11 for signal transmission. The second radiator 20 is connected to a second feed 21 for signal transmission. The third radiator is connected to a third feed A for signal transmission. The first radiator 10, the second radiator 20, and the third radiator 30 are part of the frame 102 of the mobile phone. The slot is provided on the frame 102. The third radiator 30 includes a low frequency radiator 31 constituting a low frequency antenna and a medium-high frequency radiator 33 constituting a medium-high frequency antenna. The low frequency radiator 31 and the medium-high frequency radiator 33 are spaced by a first slot 32. The low frequency radiator 31 and the medium-high frequency radiator 33 are self-grounded. Specifically, the first radiator 10, the second radiator 20, and the third radiator 30 are strip metal sheet bodies. The medium-high frequency radiator 33 of the third radiator 30 is located at the bottom portion 108. The low frequency radiator 31 is located on the first side portion 105. A connection location of the bottom portion 108 and the first side portion 105 is a corner of the mobile phone. The first slot 32 is located at the bottom portion 108 and the corner. The first radiator 10 is located on the second side portion 106 and extends to the bottom portion 108 to be spaced apart from the medium-high frequency radiator 33 by a slot. The second radiator 20 is located on the first side portion 105 and is spaced apart from the low frequency radiator 31 of the third radiator 30. Ground points of the first radiator 10, the second radiator 20, and the third radiator 30 are provided on the middle frame 101. The third feed A is provided on the mainboard 103.

The first tuning circuit B connects the third feed A and one side of the low frequency radiator 31 adjacent to the first slot 32. The second tuning circuit C connects the third feed A and an end portion of the medium-high frequency radiator 33 located in the first slot 32. The mainboard 103 is provided with a radio frequency front end (not shown). The third feed A, the first tuning circuit B, and the second tuning circuit C are connected in series at the radio frequency front end. Specifically, the third feed A is electrically connected to the first tuning circuit B and the second tuning circuit C respectively through two radio frequency signal microstrips, and transmit radio frequency signals for the first tuning circuit B and the second tuning circuit C. In addition, the radio frequency signals are electrically connected to the mainboard of the mobile phone through a cable, achieving a compact overall structure and saving space of the mobile phone. When the antenna works, the low frequency radiator 31 resonates to produce a resonance of a ¼λ mode of a low frequency and a resonance of a ¾λ mode of a medium-high frequency. The medium-high frequency radiator 33 resonated to produce a resonance of a left-handed antenna mode. The left-handed antenna is a composite left-handed transmission line structure formed by disposing a capacitor between a feed and a radiator.

In this embodiment, the low frequency radiator 31 of the third radiator 30, the first radiator 10, and the second radiator 20 form a dual low-frequency antenna mode of a 5G non-standalone (Non-Standalone, NSA), as a low frequency antenna of the mobile phone. In addition, the medium-high frequency radiator 33 serves as a medium-high frequency antenna of the mobile phone. It is not excluded that another antenna, such as a high frequency antenna, is also provided on the mobile phone. The first tuning circuit B is configured to adjust a frequency of the resonance of the ¾λ mode of the medium-high frequency produced by resonating by the low frequency radiator 31 to be less than a frequency of the resonance of the left-handed antenna mode of the medium-high frequency antenna. The second tuning circuit C is configured to adjust the frequency of the resonance of the left-handed antenna mode to be greater than the frequency of the resonance of the ¾λ mode of the medium-high frequency produced by the low frequency radiator 31. That is, it can be understood as tuning down the resonance of the ¾λ mode of the medium-high frequency so that a coverage band of the resonance is less than a resonance band of the left-handed antenna mode. When the low frequency radiator 31 of the third radiator 30, the first radiator 10, and the second radiator 20 work in the dual low-frequency antenna mode, the low frequency radiator 31 and the medium-high frequency radiator 33 work simultaneously to implement respective coverage bandwidths.

In this embodiment, a linear distance from one end of the first tuning circuit B connected to the third feed A to the other end of the first tuning circuit B connected to the low frequency radiator 31 is a first distance L2, a linear distance from one end of the second tuning circuit C connected to the third feed A to the other end of the second tuning circuit C connected to the medium-high frequency radiator 33 is a second distance L1, and values of both the first distance L1 and the second distance L2 are less than 1⁄16λ of a frequency band in which the third radiator 30 produces a low frequency, thereby ensuring that the first tuning circuit B and the second tuning circuit C adjust performance, and ensuring that the frequency of the resonance of the ¾λ mode of the medium-high frequency produced by the low frequency radiator is less than the frequency of the resonance of the left-handed antenna mode.

In this application, the third radiator serves as both a low frequency radiator and a medium-high frequency radiator, and the first tuning circuit B and the second tuning circuit C are used to adjust the resonance of the ¾λ mode of the medium-high frequency produced by the low frequency radiator 31 during operation, so that the resonance is lower than a coverage frequency of the resonance of the left-handed antenna mode of the medium-high frequency radiator 33 before tuned to the resonance of the left-handed antenna mode of the medium-high frequency radiator 33, causing the low frequency radiator 31 and the medium-high frequency radiator 33 to share a feed and to be in a state of simultaneous operation, and a resonance of the low frequency radiator 31 and a resonance of the medium-high frequency radiator to be added through feeding, thereby implementing a low frequency resonance by the low frequency radiator 31 during reception of a low-frequency signal transmitted by the third feed, without affecting the medium-high frequency radiator 33 to receive a high-frequency signal in this case and implement a high frequency resonance. In addition, the mobile phone of this application is provided with three radiators to implement coverage of a dual low frequency resonant frequency, the low frequency radiator 31 and the medium-high frequency radiator 33 share a feed and there is no need to add any feed or connection structure to the space, so that a coverage bandwidth required by an antenna can be reduced while a coverage range of the dual low-frequency resonant frequency is ensured in the limited space. For a mobile phone having the antenna of this embodiment, because the third radiator saves the space and implements the performance of simultaneous operation of the low frequency and the medium-high frequency, the mobile phone requires less space for arranging the antenna. In this way, more antennas can be arranged in the limited space, and overall performance of the mobile phone can be improved.

In an embodiment, the first tuning circuit B includes an inductor connected in series with the third feed A, and the second tuning circuit C includes a capacitor connected in series with the third feed A. Certainly, in some embodiments, the first tuning circuit B includes a capacitor connected in series with the third feed A, and the second tuning circuit C includes an inductor connected in series with the third feed A.

In an embodiment, the first tuning circuit B includes a distributed inductor connected in series with the third feed, and the second tuning circuit C includes a distributed capacitor connected in series with the third feed. Certainly, in some embodiments, the first tuning circuit B includes a distributed capacitor connected in series with the third feed, and the second tuning circuit C includes a distributed inductor connected in series with the third feed.

Figure 2B:
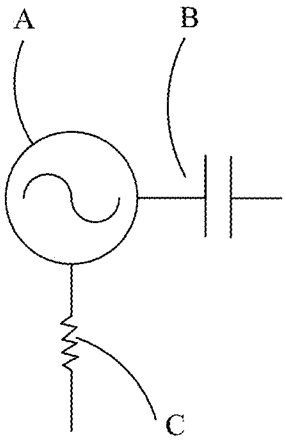
FIG. 2*b* is a schematic circuit diagram of an implementation of the first tuning circuit and the second tuning circuit of the terminal antenna shown in FIG. 2.

Referring to FIG. 2*b*, in this embodiment, the first tuning circuit B includes an inductor H connected in series with the third feed A, and the second tuning circuit C includes a capacitor C1 connected in series with the third feed A. The inductor H is greater than 6.8 nH, and the capacitor C1 is less than 2 pF. The third feed A, the inductor H, and the medium-high frequency radiator 33 are connected in series, and the third feed A, the second tuning circuit C, and the low frequency radiator 31 are connected in series, to adjust the frequency of the resonance of the ¾λ mode of the medium-high frequency produced by resonating by the low frequency radiator 31 to be less than the frequency of the resonance of the left-handed antenna mode of the medium-high frequency antenna.

Figure 2C:
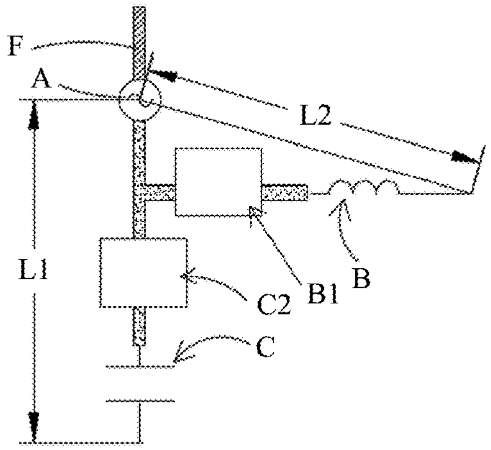
FIG. 2*c* is a schematic circuit diagram of an implementation of the first tuning circuit and the second tuning circuit of the terminal antenna shown in FIG. 2.

Referring to FIG. 2*c*, in an embodiment, the first tuning circuit B includes a first matching circuit B1 that connects the third feed A in series with the low frequency radiator 31, and the second tuning circuit C includes a second matching circuit C2 that connects the third feed A in series with the medium-high frequency radiator 33. The first matching circuit and/or the second matching circuit is an L-type matching circuit, a π-type matching circuit, or a combination of π-type and L-type matching circuits. In this embodiment, the first matching circuit B1 is an L-type matching circuit, and the second matching circuit C2 is a π-type matching circuit. According to debugging requirements, either of the first matching circuit B1 and the second matching circuit C2 may be matched with an inductor or a capacitor. The first matching circuit B1 and the inductor H are jointly used to adjust the frequency of the resonance of the ¾λ mode of the medium-high frequency produced by resonating by the low frequency radiator 31 to be less than the frequency of the resonance of the left-handed antenna mode of the medium-high frequency antenna. The second matching circuit C2 and the capacitor C1 are jointly used to adjust the frequency of the resonance of the left-handed antenna mode to be greater than the frequency of the resonance of the ¾λ mode of the medium-high frequency produced by resonating by the low frequency radiator 31.

In this embodiment, the medium-high frequency radiator 33 of this embodiment includes a medium-high frequency stub 331 and a parasitic stub 333. The medium-high frequency stub 331 and the parasitic stub 333 are spaced by a second slot 332, and the medium-high frequency stub 331 is located between the low frequency radiator 31 and the parasitic stub 333. The medium-high frequency stub 331 and the parasitic stub 333 are self-grounded. The medium-high frequency stub 331 resonates to produce a resonance of a ¼λ mode. The parasitic stub 333 produces a resonance of a parasitic mode. A ground point of the medium-high frequency stub 331 is located at one end of the medium-high frequency stub 331 away from the second slot 332. A ground point of the parasitic stub 333 is located at one end of the parasitic stub 333 away from the second slot 332. During operation, the medium-high frequency stub 331 is coupled to the parasitic stub 333 through the second slot 332 to produce a parasitic resonance, and actually, the second slot 332 is equivalent to an equivalent capacitor. Through capacitor coupling, the parasitic stub 333 also produces a particular inductive electromotive force, that is, the parasitic stub 333 produces a parasitic resonance in a particular frequency band. In other implementations, the medium-high frequency radiator can also produce other required operating bands by adjusting a location of the feed and a location of the second slot 332.

In this embodiment, the first radiator 10 resonates to produce a low frequency operating band covering 5G, the second radiator 20 resonates to produce a low frequency operating band covering 4G, and the third radiator 30 resonates to produce a low frequency operating band covering 5G and a low frequency operating band covering 4G. Actually, the third radiator 30 can resonate to produce five operating bands, the first radiator 10 resonates to produce one operating band, and the second radiator 20 resonates to produce one operating band. A frequency range of the low frequency operating band produced by resonating by the first radiator 10 is 703 MHz to 803 MHz, and a required bandwidth is 100 MHz. A frequency range of the low frequency operating band produced by resonating by the second radiator 20 is 791 MHz to 862 MHz, and a required bandwidth is 71 MHz. A receiving frequency range of a low frequency receiving band covering 5G and a low frequency receiving band covering 4G that are produced by resonating by the third radiator 30 is 758 MHz to 821 MHz, and a required bandwidth is 63 MHz. In other implementations, the operating bands produced by the first radiator 10, the second radiator 20, and the third radiator 30 may be debugged and exchanged according to actual applications. For example, the second radiator 20 resonates to produce the low frequency operating band covering 5G, and the first radiator 10 resonates to produce the low frequency operating band covering 4G. Alternatively, the first radiator 10, the second radiator 20, and the third radiator 30 produce other operating bands. This embodiment merely shows an example.

Figure 3:
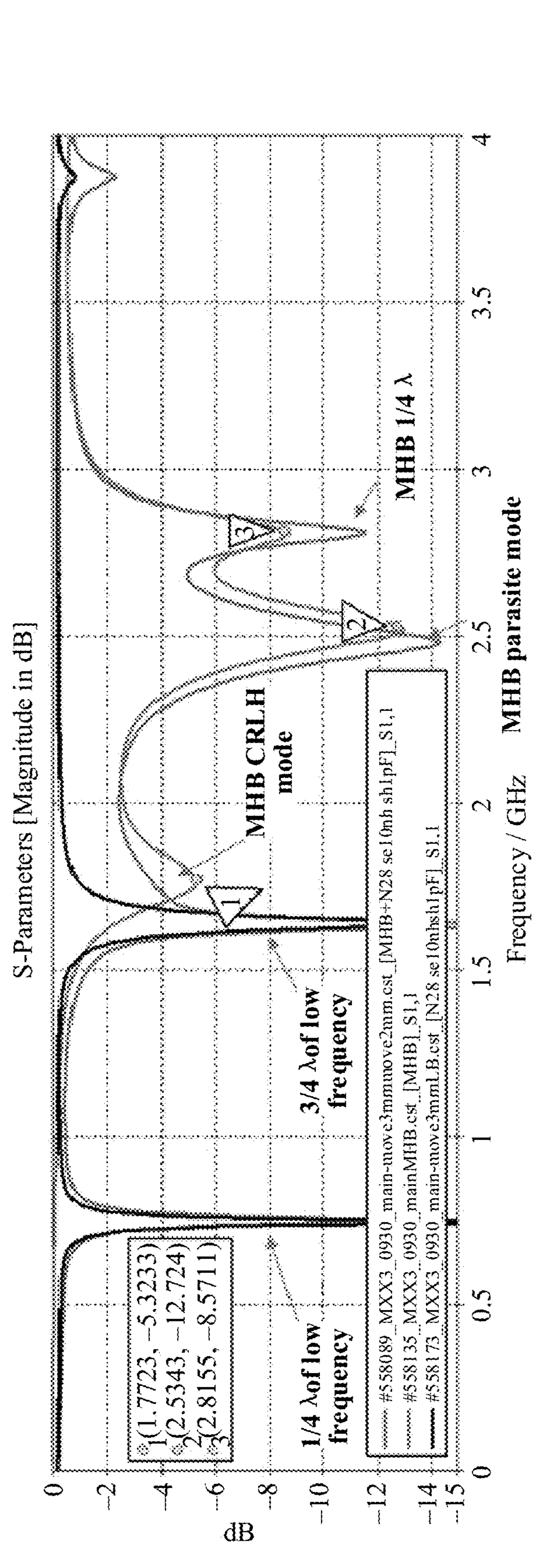
FIG. 3 is a simulation diagram of S-parameters when the low frequency radiator and a high frequency radiator of the terminal antenna shown in FIG. 2 work.
Figure 4:
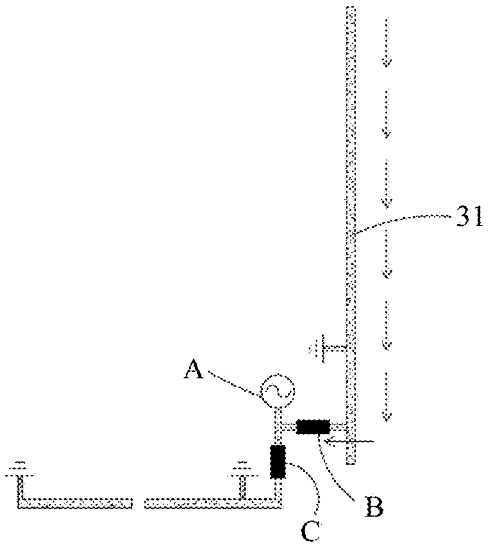
FIG. 4 is a schematic diagram of a current flow of a ¼λ mode of a low frequency produced by resonating by the low frequency radiator of the terminal antenna shown in FIG. 2.

Specifically, referring to FIG. 3, FIG. 3 is a simulation diagram of S-parameters when the low frequency radiator and a high frequency radiator of the terminal antenna shown in FIG. 2 of this application work. A horizontal coordinate represents a frequency, in a unit of GHz. A longitudinal coordinate represents an S-parameter value, in a unit of dB. A resonant frequency covered by the resonance of the ¼λ mode produced by the low frequency radiator 31 ranges from 0.5 GHz to 1 GHz. A resonant frequency covered by a high frequency resonance of the ¾λ mode produced by the low frequency radiator 31 is 1.6 GHz, and the first tuning circuit B and the second tuning circuit C modulate the high frequency of the ¾λ mode produced by the low frequency radiator 31 to 1.6 GHz. A resonant frequency of the left-handed antenna mode of the medium-high frequency radiator 33 is 1.7 GHz. Further, the medium-high frequency stub 331 produces a resonance of the left-handed antenna mode, and the frequency of the resonance of the ¼λ mode produced by the medium-high frequency stub 331 is 2.7 GHz. A frequency of a resonance produced by resonating by the parasitic stub 333 is 2 GHz. The frequency of the resonance of the parasitic stub 33 may be adjusted to be greater than 2.7 G. The medium-high frequency stub 331 and the parasitic stub 333 of this embodiment resonate to produce a frequency ranging from 1.9 GHz to 2.7 GHz.

Figure 5:
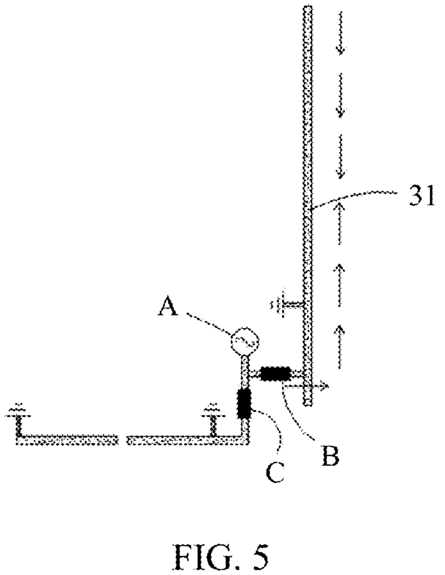
FIG. 5 is a schematic diagram of a current flow of a ¾λ mode of a medium-high frequency produced by resonating by the low frequency radiator of the terminal antenna shown in FIG. 2.
Figure 6:
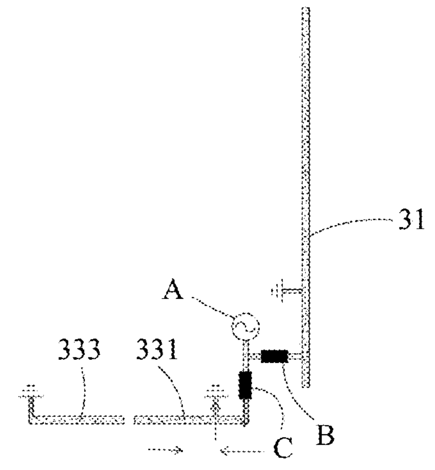
FIG. 6 is a schematic diagram of a current flow of a left-handed antenna mode produced by resonating by the medium-high frequency radiator of the terminal antenna shown in FIG. 2.
Figure 7:
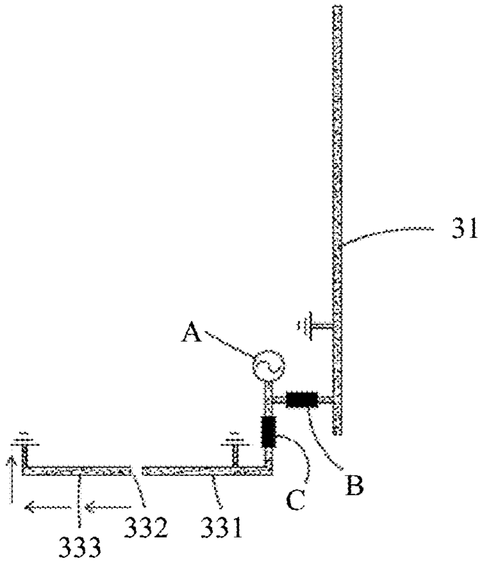
FIG. 7 is a schematic diagram of a current flow of ¼λ mode produced by resonating by a medium-high frequency stub of the terminal antenna shown in FIG. 2.
Figure 8:
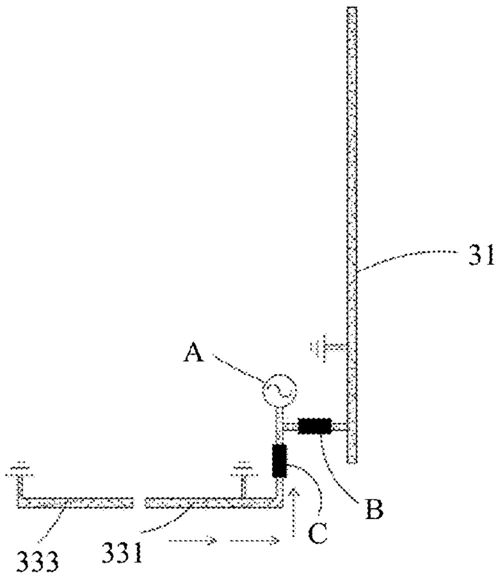
FIG. 8 is a schematic diagram of a current flow of a parasitic mode produced by resonating by a parasitic stub of the terminal antenna shown in FIG. 2.

Specifically, referring to FIG. 4 to FIG. 8, FIG. 4 is a current flow diagram of a ¼λ mode of a low frequency produced by resonating by the low frequency radiator 31, and FIG. 5 is a schematic diagram of a current flow of a ¾λ mode of a medium-high frequency produced by resonating by the low frequency radiator. FIG. 6 is a schematic diagram of a current flow of a left-handed antenna mode produced by resonating by the medium-high frequency radiator. FIG. 7 is a current flow diagram of a ¼λ mode produced by resonating by the medium-high frequency stub 331. FIG. 8 is a schematic diagram of a current flow of a parasitic mode produced by resonating by the parasitic stub 333. It should be noted that, FIG. 4 to FIG. 8 depict simplified schematic diagrams of the first tuning circuit and the second tuning circuit, specifically reflect the first tuning circuit, the second tuning circuit, and connection wiring, and are different from the simplified structural diagram of FIG. 2. The five operating bands produced by resonating by the third radiator 30 are five frequency bands respectively shown in FIG. 4 to FIG. 8. A first frequency band is the ¼λ mode of the low frequency produced by resonating by the low frequency radiator 31 receiving a low-frequency signal from the third feed A, current distribution thereof is shown by an arrow direction in FIG. 4, and a current direction is a direction in which the low frequency radiator 31 flows from one end away from the first slot 32 to the first tuning circuit B. A second frequency band is the ¾λ mode of the medium-high frequency produced by resonating by the low frequency radiator 31, and a current flow thereof is shown by an arrow direction in FIG. 5. A third frequency band is the left-handed antenna mode of the medium-high frequency antenna, a current flow is shown in FIG. 6, and the current flows from the second slot 332 and the third feed A to the ground point of the medium-high frequency stub 331 through the second tuning circuit. A fourth frequency band is the ¼λ mode produced by resonating by the medium-high frequency stub 331, a current flow thereof is shown in FIG. 7, and the current flows from the second slot 332 to the second tuning circuit C and then to the third feed A. A fifth frequency band is a mode produced by resonating by the parasitic stub 333, a current flow thereof is shown in FIG. 8, and the current flows from the second slot 332 to the ground point of the parasitic stub 333.

The first tuning circuit and the second tuning circuit are used to adjust a high frequency resonance of the ¾λ mode produced by the low frequency radiator 31 during operation from 2.4 G to 1.6 G, and the tuning is performed before the resonance of the left-handed antenna mode of the medium-high frequency radiator 33, causing the low frequency radiator 31 and the medium-high frequency radiator 33 to share a feed and achieve resonance addition through feeding in a state of simultaneous operation. In this embodiment, when the antenna is in an EN-DC working state, the low frequency radiator 31 of the third radiator 30, the first radiator 10, and the second radiator 20 form a dual low-frequency antenna mode, and a low frequency state and a medium-high frequency antenna state can coexist, without affecting a dual-card feature. In addition, a coverage bandwidth required by the low frequency antenna mode can be reduced by 15% to 30%.

Figure 9:
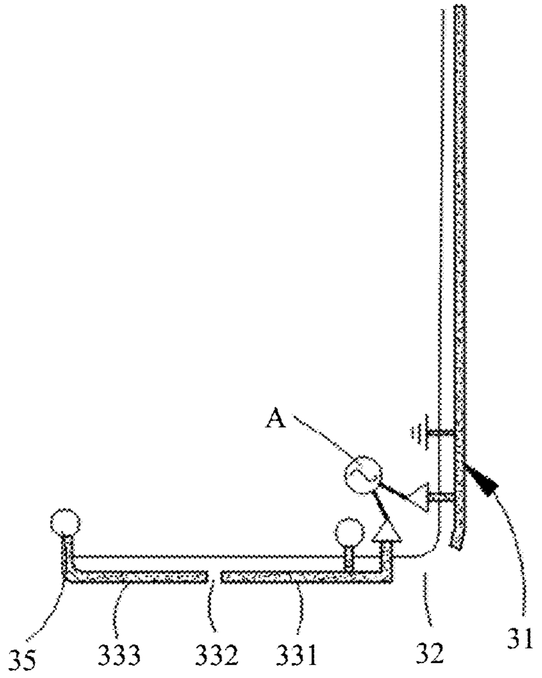
FIG. 9 is a schematic diagram of another embodiment of the terminal antenna shown in FIG. 2.

In an embodiment, FIG. 9 is an enlarged schematic structural diagram of an embodiment of an antenna of the mobile phone 100 shown in FIG. 2. A ground point of the medium-high frequency stub 331 and/or the parasitic stub 333 is further connected to a tuning element 35. The tuning element 35 is configured to adjust a type of each antenna mode and an operating band of the third radiator 30. In this embodiment, the ground points of the medium-high frequency stub 331 and the parasitic stub 333 are each connected to a tuning element E. The tuning element E is configured to adjust an operating band of the medium-high frequency radiator 33 of the third radiator 30. Any of the foregoing embodiments of this application is applicable to a mobile phone with an antenna clearance of less than 1 mm, and can save space, reduce costs, ensure antenna performance, and meet coverage bandwidth requirements.

Figure 10:
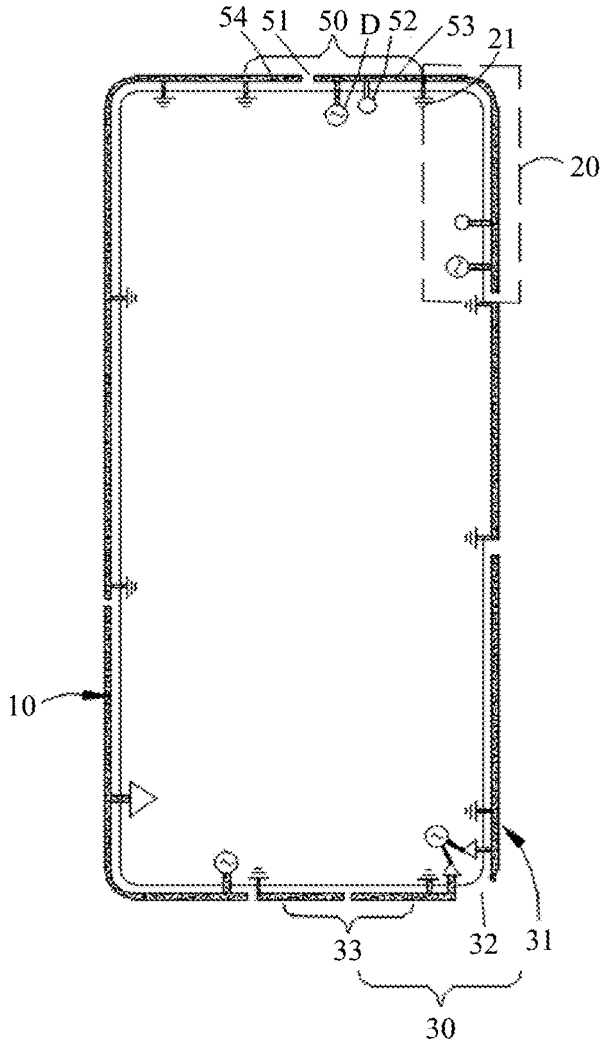
FIG. 10 is a schematic diagram of an embodiment of a terminal antenna according to this application and is used in the electronic device shown in FIG. 1.
Figure 11:
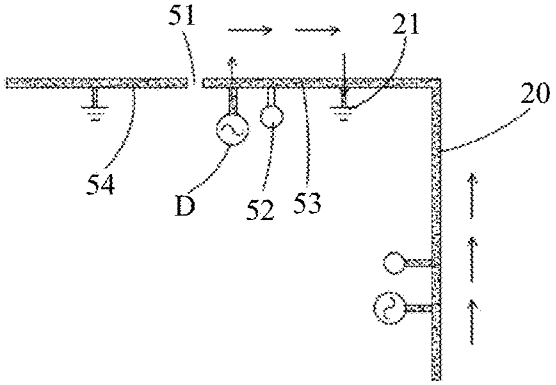
FIG. 11 is a current flow diagram of a left-handed antenna mode produced by resonating by a medium-high frequency radiation stub when a fourth radiator of the terminal antenna shown in FIG. 2 serves as a medium-high frequency antenna.

Referring to FIG. 10, in another embodiment of this application, based on the foregoing embodiments, the antenna further includes a fourth radiator 50 and a fourth feed D connected to the fourth radiator 50, and part of the frame 102 is the fourth radiator 50. The fourth radiator 50 and the third radiator 30 are located at two opposite ends of the second radiator 20. The fourth radiator 50 and the second radiator 20 are co-grounded. The fourth radiator 50 is further connected to a tuner 52. The tuner 52 adjusts the fourth radiator 50 to switch between a high frequency antenna mode and a low frequency antenna mode. The fourth radiator 50 of the low frequency antenna mode produces a same left-handed antenna mode as the fourth radiator 50 of the high frequency antenna mode and resonant frequencies are different.

In this embodiment, the fourth radiator 50 includes medium-high frequency radiation stubs 53 and medium-high frequency parasitic stubs 54 spaced by slots 51. One end of the medium-high frequency radiation stub 53 close to the slot is connected to the fourth feed D, and the other end of the medium-high frequency radiation stub 53 is co-grounded with the second radiator 20, that is, connected to the ground point 21 of the second radiator. The tuner 52 is connected to a location between the two ends of the medium-high frequency radiation stub 53. One end of the medium-high frequency parasitic stub 54 away from the slot 51 is grounded. When the fourth radiator 50 serves as a high frequency antenna, the medium-high frequency radiation stub produces a resonance of a left-handed antenna mode, and the medium-high frequency parasitic stubs 54 of the fourth radiator 50 are coupled through the slots to form a parasitic resonance. There is a slot 51 between the medium-high frequency radiation stub 53 and the medium-high frequency parasitic stub 54, and the slot 51 is equivalent to an equivalent capacitor. Therefore, through capacitor coupling, the medium-high frequency parasitic stub 54 also produces a particular inductive electromotive force, that is, the medium-high frequency parasitic stub 54 produces a parasitic resonance in a particular frequency band.

In this embodiment, that the fourth radiator resonates to produce a low frequency operating band and a medium-high frequency operating band that cover 5G can be understood as sharing a radiator by the low frequency antenna and the medium-high frequency radiator. The fourth radiator is located on the top portion 107. The second radiator 20 is located on the first side portion 105 and the top portion 107 and is co-grounded with the fourth radiator 107. The fourth feed D and the tuner 52 are provided on the mainboard 103. The fourth feed D is electrically connected to a radio frequency front end of the mainboard 101. When the fourth radiator serves as a low frequency antenna, the tuner 52 adjusts a ground location of a radio frequency signal to change an antenna operating mode of the fourth radiator 50 to implement low frequency antenna performance.

Figure 12:
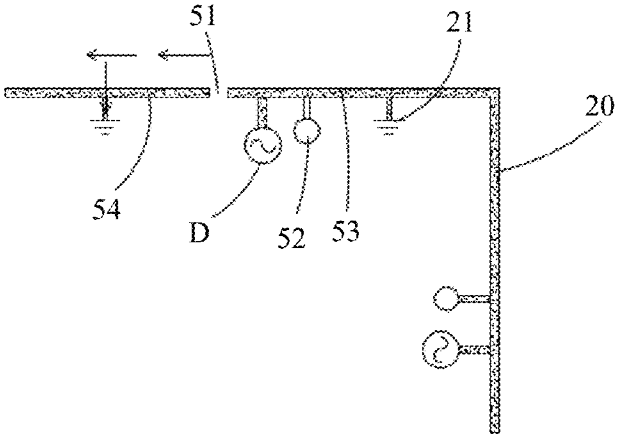
FIG. 12 is a current flow diagram of a parasitic mode produced by resonating by a medium-high frequency parasitic stub when a fourth radiator of the terminal antenna shown in FIG. 2 serves as a medium-high frequency antenna.
Figure 13:
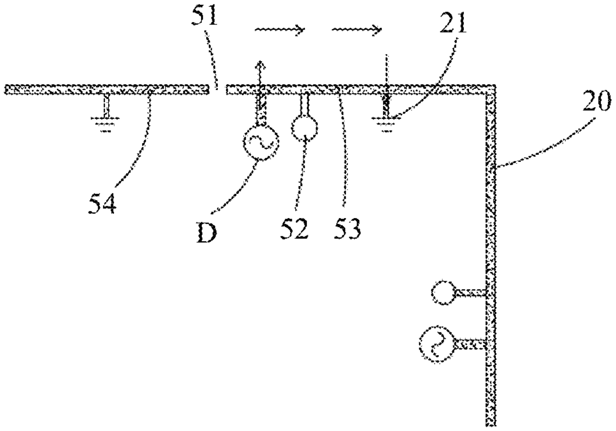
FIG. 13 is a current flow diagram when a fourth radiator of the terminal antenna shown in FIG. 2 serves as a low frequency antenna radiator.
Figure 14:
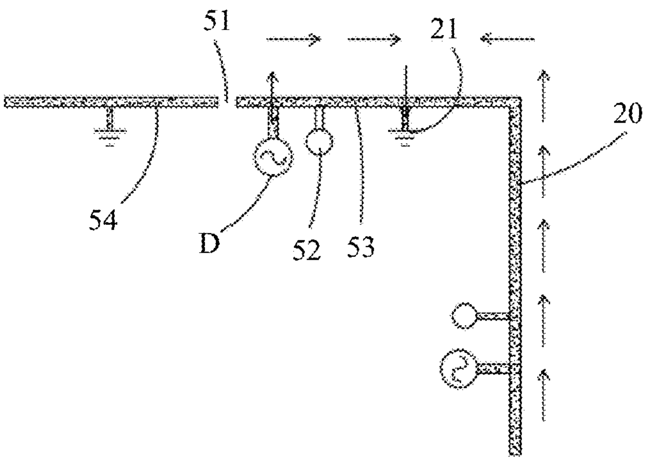
FIG. 14 is a current flow diagram of a second radiator when a fourth radiator of the terminal antenna shown in FIG. 2 serves as a low frequency antenna radiator.

Specifically, referring to FIG. 11 to FIG. 14, FIG. 11 is a current flow diagram of a left-handed antenna mode produced by resonating by the medium-high frequency radiation stub 53 when the fourth radiator 50 serves as a medium-high frequency antenna, and FIG. 12 is a current flow diagram of a parasitic mode produced by resonating by a medium-high frequency parasitic stub 54 when the fourth radiator 50 serves as a medium-high frequency antenna. FIG. 13 is a current flow diagram when the fourth radiator 50 serves as a low frequency antenna radiator. FIG. 14 is a current flow diagram of the second radiator when the fourth radiator 50 serves as a low frequency antenna radiator. When the fourth radiator 50 serves as a medium-high frequency antenna, the medium-high frequency radiation stub 53 resonates to produce a current of the left-handed antenna mode, current distribution thereof is shown by an arrow direction in FIG. 11, the current flows from the fourth feed D to the ground point 21, and a current of the second radiator 20 flows to the ground point 56. When the fourth radiator 50 serves as a medium-high frequency antenna, the medium-high frequency parasitic stub 54 resonates to produce a parasitic mode with a medium-high frequency band, a current flow thereof is shown by an arrow direction in FIG. 12, and the current flows through the slot 51 to the ground point of the medium-high frequency parasitic stub 54. When the fourth radiator 50 serves as a low frequency antenna radiator, an operating band of the left-handed antenna mode is produced by resonating, a current flow thereof is shown in FIG. 13, and the current flows from the fourth feed D to the ground point 21. When the second radiator 20 and the fourth radiator 50 that serves as a low frequency antenna radiator work simultaneously, different operating radiation bands of the left-handed antenna mode are produced, and a current flow thereof is shown in FIG. 14. A current of the fourth radiator 50 flows to the ground point 21 through the fourth feed. A current of the second radiator flows to the ground point 21 from the feed connected to the second radiator. In this embodiment, a frequency range of the low frequency operating band produced by resonating by the fourth radiator 50 is 791 MHz to 821 MHz, and a required antenna bandwidth is 30 MHz. A frequency range of an operating band of the second radiator 20 is 703 MHz to 803 MHz, and a required antenna bandwidth is 100 MHz.

The foregoing descriptions are merely some embodiments and implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A terminal antenna, comprising a first radiator, a second radiator, a third radiator, a first tuning circuit, and a second tuning circuit, wherein the third radiator, the first radiator, and the second radiator are terminal frame antenna radiators and spaced by slots, and the first radiator, the second radiator, and the third radiator are respectively connected to a first feed, a second feed, and a third feed for signal transmission;

the third radiator comprises a low frequency radiator constituting a low frequency antenna and a medium-high frequency radiator constituting a medium-high frequency antenna, and the low frequency radiator and the medium-high frequency radiator are spaced by a first slot; and the low frequency radiator and the medium-high frequency radiator are self-grounded;

the first tuning circuit connects the third feed and connects one side of the low frequency radiator adjacent to the first slot, and the second tuning circuit connects the third feed and an end portion of the medium-high frequency radiator located in the first slot;

the low frequency radiator is configured to resonate to produce a resonance of a ¼λ mode of a low frequency and a resonance of a ¾λ mode of a medium-high frequency, and the medium-high frequency radiator is configured to resonate to produce a resonance of a left-handed antenna mode; and a linear distance from one end of the first tuning circuit connected to the third feed to the other end of the first tuning circuit connected to the low frequency radiator is a first distance, a linear distance from one end of the second tuning circuit connected to the third feed to the other end of the second tuning circuit connected to the medium-high frequency radiator is a second distance, and values of both the first distance and the second distance are less than 1/16λ of a frequency band in which the third radiator produces a low frequency; and the low frequency radiator of the third radiator, the first radiator, and the second radiator jointly form a dual low-frequency antenna pattern of a 5G non-standalone NSA, wherein the low frequency radiator and the medium-high frequency radiator is configured to work simultaneously, the first tuning circuit is configured to adjust a frequency of the resonance of the ¾λ mode of the medium-high frequency produced by the low frequency radiator to be less than a frequency of the resonance of the left-handed antenna mode, and the second tuning circuit is configured to adjust the frequency of the resonance of the left-handed antenna mode to be greater than the frequency of the resonance of the ¾λ mode of the medium-high frequency produced by resonating by the low frequency radiator.

2. The terminal antenna according to claim 1, wherein the third feed is separately connected to the first tuning circuit and the second tuning circuit through a radio frequency signal microstrip, to transmit a radio frequency signal for the first tuning circuit and the second tuning circuit.

3. The terminal antenna according to claim 1, wherein the first tuning circuit comprises an inductor connected in series with the third feed and the low frequency radiator, and the second tuning circuit comprises a capacitor connected in series with the third feed and the medium-high frequency radiator.

4. The terminal antenna according to claim 1, wherein the first tuning circuit comprises a distributed inductor connected in series with the third feed, and the second tuning circuit comprises a distributed capacitor connected in series with the third feed.

5. The terminal antenna according to claim 1, wherein the first tuning circuit comprises a first matching circuit that connects the third feed in series with the low frequency radiator, the second tuning circuit comprises a second matching circuit that connects the third feed in series with the medium-high frequency radiator, and the first matching circuit and/or the second matching circuit is an L-type matching circuit, a π-type matching circuit, or a combination of π-type and L-type matching circuits.

6. The terminal antenna according to claim 1, wherein the medium-high frequency radiator comprises a medium-high frequency stub and a parasitic stub, the medium-high frequency stub and the parasitic stub are spaced by a second slot, and the medium-high frequency stub is located between the low frequency radiator and the parasitic stub; and the medium-high frequency stub and the parasitic stub are separately self-grounded, the medium-high frequency stub is configured to resonate to produce a resonance of a ¼λ mode, and the parasitic stub is configured to resonate to produce a resonance of a parasitic mode.

7. The terminal antenna according to claim 6, wherein a frequency of a resonance of the left-handed antenna mode produced by the medium-high frequency stub is 1.7 GHZ; and a resonance of the ¼λ mode produced by the medium-high frequency stub and a resonance of the parasitic mode of the parasitic stub jointly cover a frequency ranging from 1.9 GHz to 2.7 GHZ.

8. The terminal antenna according to claim 7, wherein a resonant frequency covered by the resonance of the ¼λ mode produced by the low frequency radiator ranges from 0.5 GHz to 1 GHz; and a resonant frequency covered by the resonance of the ¾λ mode of the medium-high frequency produced by the low frequency radiator ranges from 1.5 GHZ to 1.6 GHz.

9. The terminal antenna according to claim 6, wherein a ground point of the medium-high frequency stub and/or the parasitic stub is connected to a tuning element, and the tuning element is configured to adjust a type of each antenna mode and an operating band of the third radiator.

10. The terminal antenna according to claim 1, wherein when the first radiator is configured to resonate to produce a low frequency operating band covering 5G, the second radiator is configured to resonate to produce a low frequency operating band covering 4G, and when the first radiator is configured to resonate to produce a low frequency operating band covering 4G, the second radiator is configured to resonate to produce a low frequency operating band covering 5G and the third radiator is configured to resonate to produce a low frequency operating band covering 5G and a low frequency operating band covering 4G.

11. The terminal antenna according to claim 1, wherein the terminal antenna further comprises a fourth radiator and a fourth feed connected to the fourth radiator, the fourth radiator and the third radiator are located at two opposite ends of the second radiator, the fourth radiator and the second radiator are co-grounded, the fourth radiator is further connected to a tuner, the tuner adjusts the fourth radiator to switch between a high frequency antenna mode and a low frequency antenna mode, and the fourth radiator of the low frequency antenna mode produces a same left-handed antenna mode as the fourth radiator of the high frequency antenna mode.

12. The terminal antenna according to claim 11, wherein the fourth radiator comprises a medium-high frequency radiation stub and a medium-high frequency parasitic stub spaced by a slot, one end of the medium-high frequency radiation stub close to the slot is connected to the fourth feed, the other end of the medium-high frequency radiation stub is co-grounded with the second radiator, and the tuner is connected to a location between the two ends of the medium-high frequency radiation stub; and in a case that the fourth radiator serves as a high frequency antenna, the medium-high frequency radiation stub produces a resonance of a left-handed antenna mode, and the medium-high frequency parasitic stub of the fourth radiator is coupled through the slot to form a parasitic resonance.

13. The terminal antenna according to claim 11, wherein the fourth radiator is configured to resonate to produce a low frequency operating band covering 4G or 5G.

14. A terminal electronic device, comprising a middle frame, a frame provided around a periphery of the middle frame, a mainboard, and the terminal antenna according to claim 1, wherein part of the frame is the antenna, the terminal further comprises a first side portion and a bottom portion adjacent to the first side portion, the medium-high frequency radiator of the third radiator is located at the bottom portion, the low frequency radiator is located on the first side portion, ground points of the first radiator, the second radiator, and the third radiator are provided on the middle frame, and the third feed is provided on the mainboard.

15. The terminal electronic device according to claim 14, wherein in a case that the terminal antenna further comprises a fourth radiator and a fourth feed, part of the frame is the fourth radiator, the terminal further comprises a top portion, the fourth radiator is located on the top portion, the second radiator is located on the first side portion and the top portion and is co-grounded with the fourth radiator, and the fourth feed and the tuner are provided on the mainboard.

* * * * *